April 8, 1958  J. LAUTENBACHER  2,829,559
PHOTOGRAPHIC LENS SYSTEM WITH INTERCHANGEABLE PARTS
Filed May 23, 1955
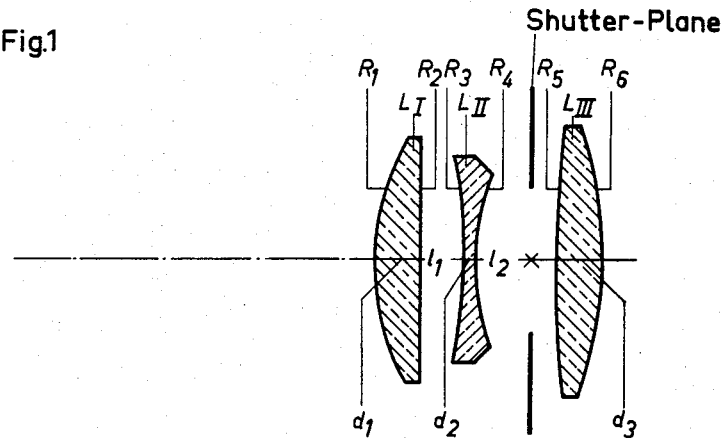
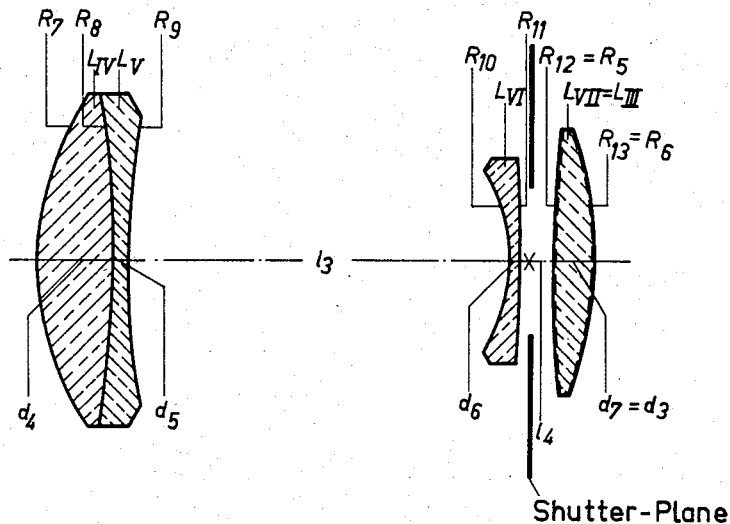
Inventor:
JOHANN
LAUTENBACHER
Richards & Geier
ATTORNEYS

United States Patent Office 2,829,559
Patented Apr. 8, 1958

2,829,559

PHOTOGRAPHIC LENS SYSTEM WITH INTERCHANGEABLE PARTS

Johann Lautenbacher, Munich, Germany, assignor to Enna-Werk Optische Anstalt Dr. Appelt K. G., Munich, Germany Application May 23, 1955, Serial No. 510,260

Claims priority, application Germany May 21, 1954

4 Claims. (Cl. 88—57)

The present invention relates to a photographic lens system set which is mounted adjacent the lens-shutter. It consists (a) of a basic lens system which shows the form of a simple or modified triplet, and (b) of at least one other lens combination which may be interchanged with the part of the basic lens system arranged in front of the shutter plane so that the focal length will be lengthened without essentially changing the focal flange length.

Lens system sets of the kind described have been mentioned for the first time by F. W. Gehrke in German Patent No. 472,234 through which a remarkable way has been shown of broadening the possibilities of use of cameras equipped with between the lens-shutters. Another lens system set of this kind is known by German Patent No. 722,520.

The present invention has for its object to improve the image quality of such lens system sets to such an extent that they may be used with equally good results as the normal taking lenses. More specifically, the present invention is limited to such lens system sets which have a basic lens system covering an angular field of at least 40° and an interchangeable lens system covering a field of at least 20°.

As the present invention shows, the improvement may be attained if—in contradiction to known lens system sets—the interchangeable parts are defined such that—according to the present invention the focal flange length of a paraxial ray coming from infinity behind the surface of the individual interchangeable part lying immediately in front of the shutter plane lies between minus two times and plus two times the focal length of the basic lens system.

The fulfillment of said condition will bring about an excellent correction of the basic lens system as well as of the interchangeable lens systems. Moreover it is possible to get this correction by using relatively few components as the following examples of the present invention show. By this invention the basic lens system may be constructed as a normal simple triplet, while the interchangeable lens systems may have the form of known simple telephoto lenses consisting of a convergent component usually comprising a simple cemented member separated from a divergent part by a relatively large air space. This divergent part normally consists of a single element of negative power turning its strongly curved concave surface to the convergent front component and a rear single convergent element. Thereby it is practical to construct the interchangeable telephoto parts in such a way that—in order to reach a relative aperture of at least 1:6.3—the radius of curvature of the front surface of the interchangeable telephoto parts ranges between 0.17 times and 0.5 times the focal length of the individual complete telephoto systems and on the other side—in order to avoid an excessively large overall length—the distance between the focal point of the front convergent part and the vertex of the strongly curved concave surface of the rear divergent part is at the utmost 0.30 times the focal length of the individual complete telephoto system.

The drawings illustrate a lens system according to the present invention.

In the drawing:

Figure 1 is a diagrammatic section through a triplet representing the basic lens system.

Figure 2 shows an interchangeable part, the elements $L_{IV}$ to $L_{VI}$ of which are combined with a rear element of Figure 1, representing the telephoto system.

In both figures the individual elements are indicated by L, the radii by R, the axial thicknesses by d, and the axial air spaces by l.

The basic lens system of the following Example 1 illustrated in Fig. 1 represents a simple triplet with a relative aperture of 1:3.5 and a focal length $f=77.321$ mm. having in the usual manner the diaphragm in front of the rear element. The paraxial back focal length behind the 4th surface is $s'_4=439.252$ mm. The interchangeable part illustrated in Fig. 2 consists of a cemented convergent front component separated from a divergent single element by a relatively large air space, said divergent single element turning its strongly curved concave surface to the cemented front component and in combination with the rear single element of the basic lens system from which it is separated only by a smaller air space representing the divergent part of normal telephoto lens systems. The interchangeable telephoto lens system has a focal length $f=140.000$ mm. Its relative aperture amounts to 1:11.6. The back focal length behind the 5th surface is $s'_{11}=445.000$ mm. In this case the diaphragm is arranged within the large air space. This lens system is supposed to be used in 6×6 cameras equipped with a between the lens-shutter.

The basic lens of Example 2 illustrated in Fig. 1 represents a single triplet of an aperture of 1:2.8 and a focal length $f=51.000$ mm. The diaphragm is arranged immediately in front of the rear convergent element. The paraxial back focal length behind the 4th surface is $s'_4=188.558$ mm., thus being greater than twice 51.000 mm. The interchangeable telephoto part illustrated in Fig. 2 shows a similar form as in Example 1. It represents in combination with the rear element of the basic lens system a telephoto lens having a focal length of $f=90.611$ mm. and a relative aperture of 1:4.5. The paraxial back focal length behind the 11th surface is $s'_{11}=192.186$ mm. Also in this case the diaphragm is arranged within the large air space. This lens system is supposed to be used in 35 mm. cameras equipped with a between the lens-shutter.

In the following examples R means the radii of the lenses, d the axial thicknesses of the lenses, l the air spaces between the lenses, n the refractive indices—with respect to the yellow helium line of the spectrum, v the Abbe-numbers and s' the paraxial back focal length behind a determined surface.

EXAMPLE 1

*Basic lens system*

[Focal length $f=77.321$ mm. Relative aperture: 1:3.5. Angular field: 55°. Paraxial back focal length $s'_6=62.851$ mm. Paraxial back focal length behind the 4th surface: $s'_4=-439.252$ mm.]

| | | | |
|---|---|---|---|
| $R_1=+24.751$ | $d_1=4.25$ | $n_1=1.69100$ | $v_1=54.8$ |
| $R_2=\infty$ | $l_1=4.41$ | | |
| $R_3=-58.784$ | $d_2=0.92$ | $n_2=1.64611$ | $v_2=34.0$ |
| $R_4=+24.653$ | $l_2=8.50$ | | |
| $R_5=+430.360$ | $d_3=4.20$ | $n_3=1.67003$ | $v_3=47.2$ |
| $R_6=-40.397$ | | | |

Interchangeable telephoto lens

[Focal length $f=140.000$ mm. Relative aperture: 1:5.6. Angular field: 32°. Paraxial back focal length $s'_{13}=62.836$ mm. Paraxial back focal length behind the 11th surface: $s'_{11}=-445.000$ mm.]

| | | | |
|---|---|---|---|
| $R_7=+$ 29.456 | $d_4=$ 7.10 | $n_4=1.57099$ | $v_4=51.0$ |
| $R_8=-$ 98.000 | $d_5=$ 1.52 | $n_5=1.72825$ | $v_5=28.3$ |
| $R_9=+108.805$ | $l_3=37.95$ | | |
| $R_{10}=-$ 17.640 | $d_6=$ 0.56 | $n_6=1.50137$ | $v_6=56.5$ |
| $R_{11}=+770.000$ | $l_4=$ 3.50 | | |
| $R_{12}=R_5=430.360$ | $d_7=d_3=4.20$ | $n_7=n_3=1.67003$ | $v_7=v_3=47.2$ |
| $R_{13}=R_6=$ 40.397 | | | |

EXAMPLE 2

Basic lens system

[Focal length $f=51.000$ mm. Relative aperture: 1:2.8. Angular field: 46°. Paraxial back focal length $s'_6=40.105$ mm. Paraxial back focal length behind the 4th surface: $s'_4=-188.558$ mm.]

| | | | |
|---|---|---|---|
| $R_1=+$ 18.826 | $d_1=3.56$ | $n_1=1.69100$ | $v_1=54.8$ |
| $R_2=\infty$ | $l_1=4.07$ | | |
| $R_3=-$ 37.287 | $d_2=0.92$ | $n_2=1.66680$ | $v_2=33.1$ |
| $R_4=+$ 18.851 | $l_2=6.10$ | | |
| $R_5=+158.984$ | $d_3=3.55$ | $n_3=1.72005$ | $v_3=50.3$ |
| $R_6=-$ 28.191 | | | |

Interchangeable telephoto lens

[Focal length $f=90.611$ mm. Relative aperture: 1:4.5. Angular field: 27°. Paraxial back focal length $s'_{13}=40.097$ mm. Paraxial back focal length behind the 11th surface: $s'_{11}=-192.186$ mm.]

| | | | |
|---|---|---|---|
| $R_7=+$ 18.685 | $d_4=$ 4.74 | $n_4=1.57099$ | $v_4=51.0$ |
| $R_8=-$ 63.060 | $d_5=$ 0.62 | $n_5=1.74000$ | $v_5=28.2$ |
| $R_9=+$ 72.563 | $l_3=24.38$ | | |
| $R_{10}=-$ 11.122 | $d_6=$ 0.89 | $n_6=1.51284$ | $v_6=57.2$ |
| $R_{11}=+191.551$ | $l_4=$ 2.66 | | |
| $R_{12}=R_5=+158.984$ | $d_7=d_3=3.55$ | $n_7=n_3=1.72005$ | $v_7=v_3=50.3$ |
| $R_{13}=R_6=-$ 28.191 | | | |

The present invention is not intended to be limited to the use only of simple objective forms as described above. It can also be adapted to modified or more complicated objective systems, which systems would require more-membered lens combinations. For example with this invention even when using additional elements in the interchangeable telephoto portion it is possible to utilize the identical diaphragm as used by the basic lens when using the interchangeable telephoto system.

What is claimed is:

1. A photographic lens system set as described, characterized in that for the interchangeable parts the back focal length behind the surface lying immediately in front of the shutter plane lies between minus two times and plus two times the focal length of the basic lens system, that the front radius of the curvature of the convergent front component of the interchangeable telephoto part ranges between 0.17 times and 0.5 times the focal length of the complete telephoto system, and that the distance between the focus of the convergent front component of the interchangeable telephoto part and the vertex of the strongly curved concave surface of the rear divergent component lies between 0.1 times and 0.3 times the focal length of the complete interchangeable telephoto system.

2. A photographic lens system set as claimed in claim 1, characterized in that the basic lens system has a relative aperture of at least 1:4.5 and the individual complete interchangeable telephoto system has a relative aperture of at least 1:6.3.

3. A photographic lens system set as claimed in claim 1, characterized by the following data:

Basic lens system

[Focal length $f=77.321$ mm. Relative aperture: 1:3.5. Angular field: 55°. Paraxial back focal length $s'_6=62.851$. $s'_4=-439.252$ mm.]

| | | | |
|---|---|---|---|
| $R_1=+$ 24.751 | $d_1=4.25$ | $n_1=1.69100$ | $v_1=54.8$ |
| $R_2=\infty$ | $l_1=4.41$ | | |
| $R_3=-$ 58.784 | $d_2=0.92$ | $n_2=1.64611$ | $v_2=34.0$ |
| $R_4=+$ 24.653 | $l_2=8.50$ | | |
| $R_5=+430.360$ | $d_3=4.20$ | $n_3=1.67003$ | $v_3=47.2$ |
| $R_6=-$ 40.397 | | | |

Interchangeable telephoto lens

[Focal length $f=140.000$ mm. Relative aperture: 1:5.6. Angular field: 32°. Paraxial back focal length $s'_{13}=62.836$ mm. Paraxial back focal length behind the 11th surface: $s'_{11}=-445.000$ mm.]

| | | | |
|---|---|---|---|
| $R_7=+$ 29.456 | $d_4=$ 7.10 | $n_4=1.57099$ | $v_4=51.0$ |
| $R_8=-$ 98.000 | $d_5=$ 1.52 | $n_5=1.72825$ | $v_5=28.3$ |
| $R_9=+108.805$ | $l_3=37.95$ | | |
| $R_{10}=-$ 17.640 | $d_6=$ 0.56 | $n_6=1.50137$ | $v_6=56.5$ |
| $R_{11}=+770.000$ | $l_4=$ 3.50 | | |
| $R_{12}=R_5=+430.360$ | $d_7=d_3=4.20$ | $n_7=n_3=1.67003$ | $v_7=v_3=47.2$ |
| $R_{13}=R_6=-$ 40.397 | | | | wherein R are the radii of the lenses, $d$ the thicknesses of the lenses, $l$ the air spaces between the lenses, $n$ the refractive indices, $v$ the Abbe numbers and $s'$ the paraxial focal length behind a determined surface.

4. A photographic lens system set as claimed in claim 1, characterized by the following data:

Basic lens system

[Focal length $f=51.000$ mm. Relative aperture: 1:2.8. Angular field: 46°. Paraxial focal length $s'_6=40.105$ mm. Paraxial back focal length behind the 4th surface: $s'_4=-188.558$ mm.]

| | | | |
|---|---|---|---|
| $R_1=+$ 18.826 | $d_1=3.56$ | $n_1=1.69100$ | $v_1=54.8$ |
| $R_2=\infty$ | $l_1=4.07$ | | |
| $R_3=-$ 37.287 | $d_2=0.92$ | $n_2=1.66680$ | $v_2=33.1$ |
| $R_4=+$ 18.851 | $l_2=6.10$ | | |
| $R_5=+158.984$ | $d_3=3.55$ | $n_3=1.72005$ | $v_3=50.3$ |
| $R_6=-$ 28.191 | | | |

Interchangeable telephoto lens

[Focal length $f=90.611$ mm. Relative aperture: 1:4.5. Angular field: 27°. Paraxial back focal length $s'_{13}=40.097$ mm. Paraxial back focal length behind the 11th surface: $s'_{11}=-192.186$ mm.]

| | | | |
|---|---|---|---|
| $R_7=+$ 18.685 | $d_4=4.74$ | $n_4=1.57099$ | $v_4=51.0$ |
| $R_8=-$ 63.060 | $d_5=$ 0.62 | $n_5=1.74000$ | $v_5=28.2$ |
| $R_9=+$ 72.563 | $l_3=24.38$ | | |
| $R_{10}=-$ 11.122 | $d_6=$ 0.89 | $n_6=1.51284$ | $v_6=57.2$ |
| $R_{11}=+191.551$ | $l_4=$ 2.66 | | |
| $R_{12}=R_5=+158.984$ | $d_7=d_3=3.55$ | $n_7=n_3=1.72005$ | $v_7=v_3=50.3$ |
| $R_{13}=R_6=-$ 28.191 | | | | wherein R are the radii of the lenses, $d$ the axial thicknesses of the lenses, $l$ the air spaces between the lenses, $n$ the refractive indices, $v$ the Abbe numbers and $s'$ the paraxial back focal length behind a determined surface.

References Cited in the file of this patent

UNITED STATES PATENTS

| | | |
|---|---|---|
| 1,073,789 | Wandersleb | Sept. 23, 1913 |
| 1,987,878 | Tronnier | Jan. 15, 1935 |
| 2,169,130 | Tronnier et al. | Aug. 8, 1939 |
| 2,184,018 | Ort | Dec. 19, 1939 |
| 2,631,497 | Schlegel | Mar. 17, 1953 |

FOREIGN PATENTS

| | | |
|---|---|---|
| 472,234 | Germany | Mar. 5, 1929 |
| 722,520 | Germany | July 11, 1942 |